United States Patent [19]

Harre et al.

[11] 4,180,217

[45] Dec. 25, 1979

[54] FISHING REELS FOR RETAINING THE LINE DURING CASTING

[75] Inventors: Kurt J. S. Harre, Karlshamn; Kent A. Tufvesson, Asarum, both of Sweden

[73] Assignee: ABU Aktiebolag, Svangsta, Sweden

[21] Appl. No.: 923,431

[22] Filed: Jul. 10, 1978

Related U.S. Application Data

[63] Continuation of Ser. No. 759,357, Jan. 14, 1978, abandoned.

[30] Foreign Application Priority Data

Jan. 22, 1976 [SE] Sweden .............................. 7600629

[51] Int. Cl.² ............................................. A01K 89/01
[52] U.S. Cl. ................................................ 242/84.2 A
[58] Field of Search ................. 242/84.21 A, 84.2 A, 242/84.2 R

[56] References Cited

U.S. PATENT DOCUMENTS

| | | | |
|---|---|---|---|
| 2,586,921 | 2/1952 | Delphon | 242/84.2 A |
| 2,988,298 | 6/1961 | Purnell | 242/84.2 A |
| 3,006,573 | 10/1961 | Holahan, Jr. | 242/84.2 A |
| 3,034,741 | 5/1962 | Macy | 242/84.2 A |
| 3,108,760 | 10/1963 | Mirmse | 242/84.2 A |
| 3,298,628 | 1/1967 | Harrington et al. | 242/84.2 A |
| 3,322,370 | 5/1967 | Siegrist | 242/84.21 A |
| 3,325,115 | 6/1967 | Sarah | 242/84.2 A |

FOREIGN PATENT DOCUMENTS 1437545  3/1966  France .............................. 242/84.21 A

*Primary Examiner*—Billy S. Taylor
*Attorney, Agent, or Firm*—Karl W. Flocks

[57] ABSTRACT

The invention provides a fishing reel having a releasable line retaining mechanism which is operable from a normal released position into a line retaining position for the initiating part of a casting operation by means of a thumb-operable knob which is pivotally mounted in a low position at a rear portion of the fishing reel, wherein the knob has an operating surface situated on a level between the longitudinal axis of the line spool and the fishing reel foot and wherein the pivot axis of the knob is situated on a level well below the operating surface of the knob.

5 Claims, 7 Drawing Figures

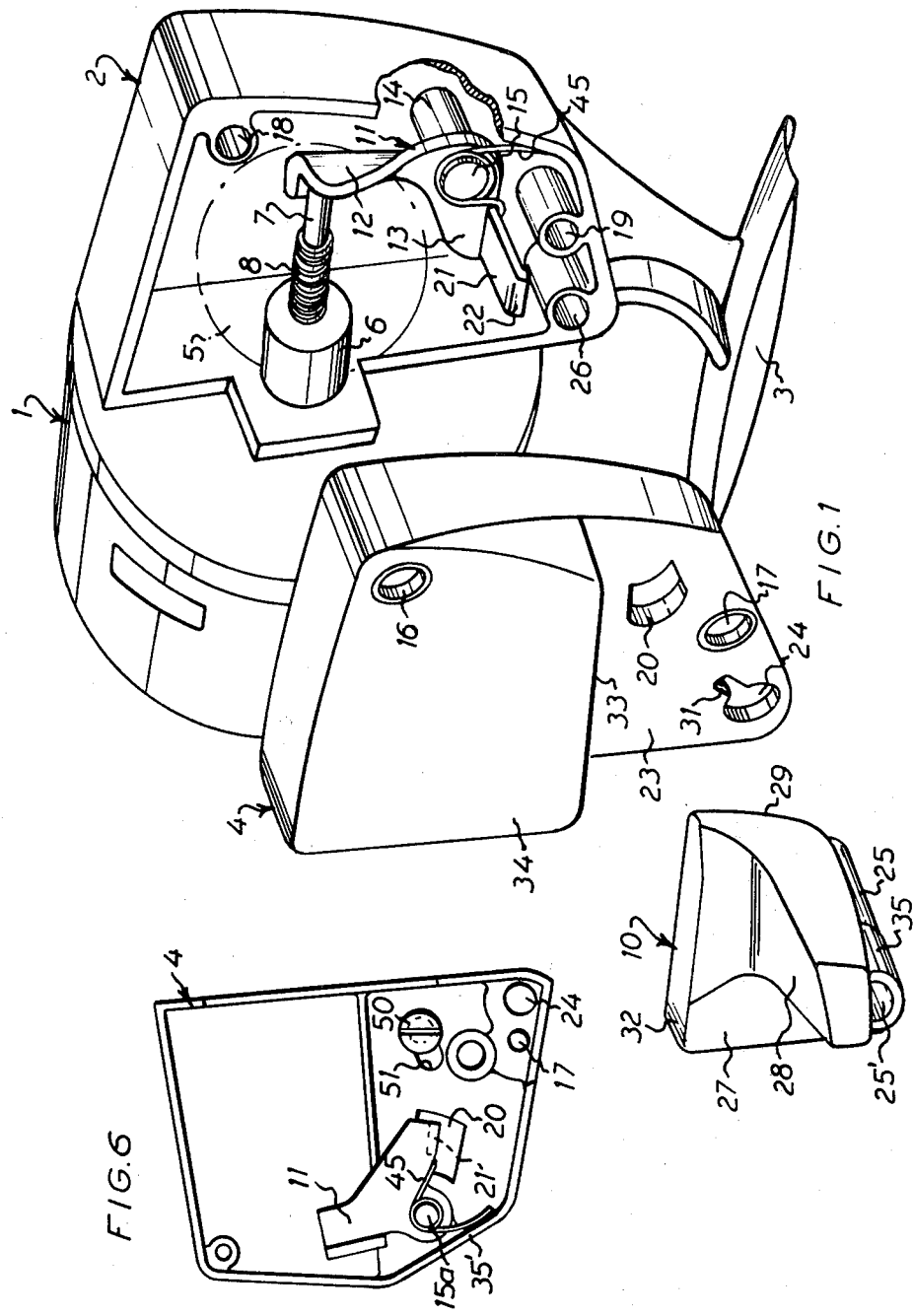

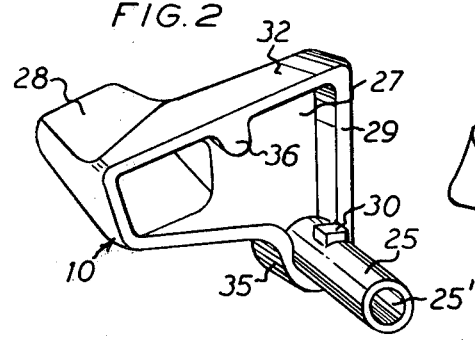
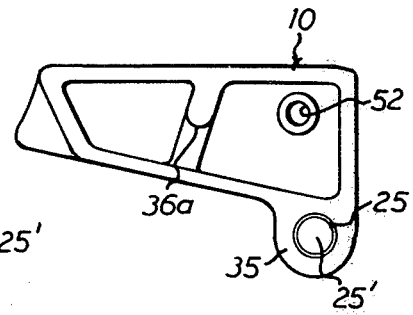
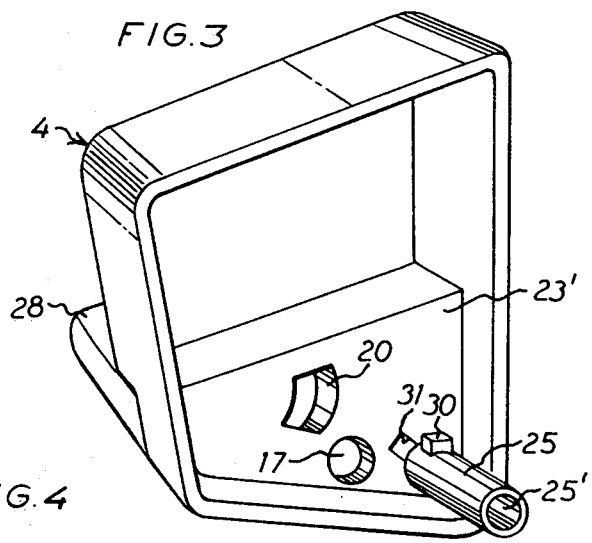
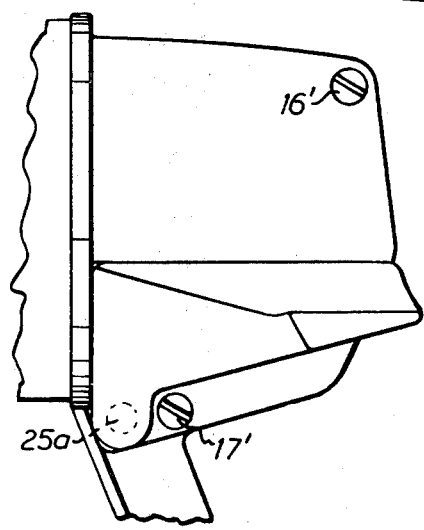
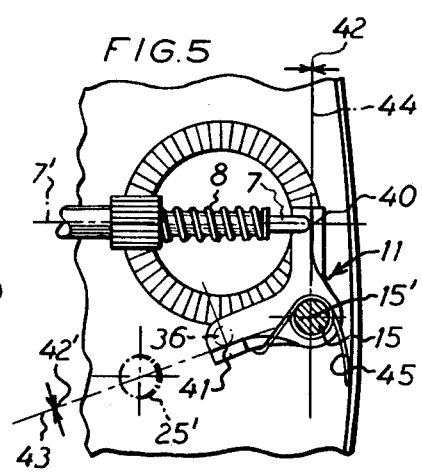

FISHING REELS FOR RETAINING THE LINE DURING CASTING

This is a continuation of application Ser. No. 759,357, filed Jan. 14, 1978 and now abandoned.

The present invention relates to an improvement in fishing reels of the kind which comprises a reel housing and a base having a foot for mounting the reel on a fishing rod and a releasable line-retaining mechanism having a releasing spring means, and a thumb-operable knob for operating the line-retaining means during casting, said knob being pivotally mounted on a rear part of the fishing reel and having an operating surface which in a normal position of the reel mounted on the fishing rod is accessible to the thumb of the user's hand holding the rod.

In generally known releasable line-retaining devices of this type, the thumb-operable knob is mounted at the rear end of the reel to be pressed downwardly in the direction of the fishin rod with the thumb of the hand holding the rod. For operating the line-retaining mechanism to retain the line the thumb must urge the knob against the action of the releasing spring and also exert sufficient pressure upon the knob for holding the line-retaining mechanism in its operative position for retaining the line. The degree to which the thumb is strained thereby depends largely on the positions of the thumb relative to the hand during the various moments of the operation of the knob and, especially, on the final position of the thumb for retaining the line against the spring force as well as against the force acting on the line from the weight of the bait during the initial moment of a casting operation before the moment in which the fisherman allows the line to run out by releasing the knob, thereby permitting the releasing spring to return the line-retaining mechanism into its inactive position.

In the inactive position of the line-retaining mechanism the operating surface of the knob should be conveniently accessible to the thumb of the user's "rod hand", that is the hand grasping the rod, without it being necessary for the hand to release a firm grasp of the rod, but this is not a sufficient condition for convenient operation of the knob because, throughout the movement of the knob from the initial position to the final position, in which the required compressive force is exerted by the thumb on the knob for retaining the line, the operating surface of the knob should move in the natural direction of movement of the thumb and, moreover, the operating transmission or linkage between the knob means of the line-retaining mechanism which acts as line-retaining member should be of a construction which will permit safely retaining the line during casting without any need of exaggerated force on the knob. Heretofore known devices do not comply with these requirements to the degree desired.

The general object of the invention is, however, to provide a device of the type described in the opening paragraph so as to permit convenient operation of the operating knob while the required compressive force can be exerted on the knob for retaining the line with the least possible strain of the thumb.

More specifically, the invention has for its object to provide a fishing reel in which the operating knob for the line-retaining mechanism is mounted on a low level within easy reach for the thumb of the user's "rod hand" and to effect a movement which agrees with the natural movement of the thumb.

A further object of the invention is to provide a device in which the ratio between a push rod for acting on a line-retaining member and the operating knob may be selected such that the required operating force will remain moderate also when retaining heavy trolling-spoons.

Still another object of the invention is to provide a line-retaining means having an operating knob comprising a wall portion which will match substantially with the contour of the rear face of the reel housing in order to present a compact, trim appearance and so that the knob allows the tightest possible closure of the rear part of the reel housing, which is arranged as a gear housing.

These objects have been achieved by the fishing reel of the present invention, wherein the pixot axis of the knob is located on a level between the longitudinal axis of the line spool and the foot of the housing, and below the main portion of the operating surface of the knob. Other characteristic features of preferred embodiments will become apparent from the following description and claims.

The invention will now be particularly described with reference to the accompanying drawings, wherein:

FIG. 1 is a perspective view of a non-rotary fishing reel provided with operating means for actuating a line-retaining member, showing the cover of the gear housing and the operating knob disassembled but placed in proper relative positions for assembling and mounting;

FIG. 2 is a perspective view of the operating knob of FIG. 1, as seen from the inside;

FIG. 3 is a perspective view of the cover of FIG. 1, as seen from the inside and with the operating knob mounted on the cover;

FIGS. 4 and 5 are, respectively, a side view and an interior view of the rear part of a fishing reel with a modified braking knob and lever for operation of the push rod;

FIG. 6 shows the inside of the cover of FIG. 4, with the lever mounted on the shaft of the operating knob; and FIG. 7 shows the inside of the operating knob of FIG. 4.

The fishing reel shown in FIG. 1 is an enclosed non-rotary type fishing reel which includes a reel housing 1 the rear part 2 of which carries the foot 3 of the housing and constitutes a gear housing having a removable cover 4. The gear may be a worm or bevel gear which is driven in a conventional manner by means of a crank (not shown) and may consist of a rotary gear wheel 5 and a pinion 6 which is driven by said gear wheel 5 and which, according to the embodiment shown, is mounted on a rod 7 and adapted to drive the line-winding member (not shown) of the reel. The rod 7 is axially displaceable in the pinion 6 and forms a push rod the leading end of which is connected with a line-retaining member (not shown).

The reel so far described is known since long and it is also known to operate the push rod 7 by means of an operating knob pivotally mounted on the reel housing. This knob makes it possible to displace the push rod 7 forwards against the action of a spring 8 in order to retain the line via the line-retaining member. When released, the knob is automatically retracted to inactive position by means of the spring 8, arranged on the push rod 7, whereby the line will be released for running out during casting. It is also known to arrange the operating knob in such manner at the rear part 2 of the reel housing that the knob can be operated by the thumb of the user's hand holding the fishing rod, the so-called "fishing rod hand". Usually the knob is pivotally mounted on a pivot placed above the push rod 7 and forms at the same time a closing element for an opening for the knob 5 in the rear wall of the gear housing, such as the rear part of the opening shown in FIG. 1 at the left-hand side of the gear housing 2.

The prior art designs have several disadvantages. The necessary pivoting movement of the knob implies that the knob closes the opening in the gear housing 2 efficiently only in a position which usually is the position of rest of the knob, and the mounting of the knob with the pivot axis in a relatively high position above the operating surface of the knob results in a knob arrangement which is disadvantageous from the points of view of function and convenience.

According to the embodiment of the invention as illustrated in the drawings the operating knob 10 is pivotally mounted at the lower rear part of the housing 1 on one side of the gear casing 2 close to the foot 3 of the housing and, besides, the operating knob 10 is adapted to actuate the push rod 7 by gearing via a lever 11 acting between the knob and the push rod.

The lever 11 is in the form of a bell crank which by means of a bearing 14, at a point between its two arms 12, 13, is pivotally mounted on a pivot 15 which, according to the embodiment of FIG. 1, is connected with the part 2 of the housing. In the inactive position the upper part 12 of the lever 11 lies close to the rear end of the push rod 7 which, in this inactive position, is in a rearwardly displaced position. In this position the reel line (as far as the release member is concerned) is free for running out.

The cover 4, which forms one half of the gear casing whose other half is formed of the part 2 of the housing, is so arranged that, after being mounted on the part 2, it forms together with this part a substantially completely closed housing for the gear 5, 6, the push rod 7 and the lever/bell crank 11.

As shown in FIG. 1, the cover 4 has a pair of countersunk screw holes 16, 17, and the part 2 of the housing has a pair of corresponding threaded holes 18, 19 for mounting of the cover 4 by means of two screws (16', 17' in FIG. 4). In its lower part the cover 4 has a bow-shaped aperture 20 through which a transversely extending projection 21 from the lower arm 13 of the lever/bell crank 11 is introduced when the cover is mounted. When the cover 4 is in mounted position, this projection 21 with its end 22 extends out through the cover but, as will appear from below, both this end of the projection 21 and the aperture 20 are covered by the knob 10 when this is mounted.

The box-shaped cover 4 has at its bottom an external recess with a plane side surface 23 permitting a partially enclosed mounting of the knob 10 in the direction of the central plane of the housing. Arranged in the recessed wall 23 are the bow-shaped aperture 20 for the projection 21 of the arm 13 and one of the holes 17 for attachment of the cover, as well as a hole 24 for a pivot pin 25 for the mounting of the knob 10. When the knob 10 is to be mounted the pivot pin 25 is inserted into a hole 26 in the part 2 of the housing near the hole for the lower fixing screw.

The knob 10 which, like the cover 4, is preferably molded from plastic material includes a box-shaped base portion 27 and a part 28 projecting from the outside of the base portion and having an operating surface designed to suit the thumb of the "rod hand". The box-shaped base portion 27 of the knob has a plane edge surface 29 facing the recessed plane cover surface 23, and the knob may be molded integrally with the pivot pin 25 which (see FIG. 2) may be hollow. For fixing the knob 10 axially relative to the cover 4 the pin 25 has a locking dog 30 and a notch 31 is formed in conjunction with the hole 24 in the cover 4. The locking dog 30 and the notch 31 are so arranged that the pin 25, when the knob 10 is to be mounted on the cover 4, can be inserted in the hole 24 in that the locking dog 30, when the knob 10 is is a certain angular position, may pass through the notch 31 and, when the knob is then turned into the intended position of use, the locking dog 30 is moved inwardly behind the inside 23' of the recessed locking wall 23. In this position the straight upper side 32 of the box-shaped base portion 27 of the knob 10 extends substantially parallel with a straight transverse shoulder surface 33 between the recessed plane surface 23 of the knob and a projecting breast portion 34 of the cover 4 located above this surface. The upper side 32 of the box-shaped base portion 27 of the knob thus adjoins the lower shoulder surface 33 of the projecting breast portion and the front and lower side surfaces of the knob adjoin substantially the side surfaces of the cover in the area of the cover recess 23.

Owing to this arrangement of the knob 10 relative to the cover 4 the contour of the rear part of the reel housing is filled out so as to present a neat, "clean" appearance.

In both embodiments shown (see respectively FIG. 2 and FIGS. 4, 7) the operating knob 10 has its pivot axis 25' positioned on a lower projection 35 of the knob to facilitate mounting of the lower fixing screw for the cover. After mounting of the cover and the knob the latter may be swung to a degree sufficient for the required operation of the lever 11.

It is apparent from the above description of the cover 4 and the knob 10 that the knob according to the design of this invention need not constitute any closing element for the gear housing which instead is completely closed by the cover 4. It also appears from this description that the knob 10 has a low position and that its pivot axis 25' is located at the bottom part of the knob 10 comparatively close to the foot 3, resulting in a very convenient position for the operating portion 28 of the knob with its operating surface designed to suit the "fishing rod hand" thumb. However, as will appear from below the design according to this invention also gives another functionally most important advantage.

The bell crank 11 forms a gearing between the knob 10 and the push rod 7. For cooperation with the projection 21 of the bell crank 11 the knob 10 is provided with a shoulder 36 on its inside. In the embodiment of FIG. 2 the shoulder 36 is disposed on the inside of the upper wall 32 of the box-shaped base portion 27. The outer end 22 of the projection 21 is bent in downward direction and forms a climbing surface for the mounting of the knob 10 so that the projection 21 abuts the shoulder 36 projecting from the inside of the wall 32 in order to be actuated when the knob pivots. In the inactive position the push rod 7 is kept in a rear end position and the lever/bell crank 11 is kept in a position such that its projection 21 rests against or near the shoulder 36. By pressure being exerted upon the knob 10 by means of the thumb of the "fishing rod hand", in its natural direction of movement, while the hand holds the fishing rod, the knob 10 will pivot, whereby the lever/bell crank 11 is actuated by the shoulder 36 and is swung on the pivot 15 and displaces the push rod 7 forwards and away from the rear position.

The geometry of the operating system is schematically illustrated in FIG. 5. The operating system of FIGS. 4–7 is slightly modified in relation to the operating system of FIGS. 1–3 but geometrically the two operating systems act in the same manner. The following description thus applies to both the embodiments according to the invention and the same reference numerals are used in FIGS. 4–7 for the same parts irrespective of modifications of form.

As shown in FIG. 5 the lever/bell crank 11 has such a geometry that the point of contact 40 between the push rod 7 and the crank 11 and the point of contact 41 between the knob shoulder 36 and the crank 11 lie in the direction of the resultants (arrows 42, 42') when the knob 10 is operated and held by means of the "fishing rod hand" thumb in a position in which the push rod 7 is kept pressed forwardly, i.e. the knob 10 and the bell crank 11 are placed and arranged in such a way that a line 43 between the pivot axis 25' of the knob 10 and the pivot axis 15' of the crank 11 is perpendicular to the direction of force in the point of action 41 between the knob 10 and the crank 11, such that a line 44 from the point of action 40 between the crank 11 and the push rod 7 to the axis 15' of the crank 11 forms an angle of approximately 90° with the line 43 and with the longitudinal axis 7' of the push rod 7 (which coincides with the axis of the line spool). The compressive force from the thumb required to hold the line will thus be as small as possible, and because the pivot axis 25' of the knob is adjacent to the operating surface of the knob, the required operating movement will be short. A suitable ratio for the operating and compressing force may be chosen by selecting a suitable relationship between the parts 12, 13 of the crank 11.

The embodiment of the cover, the operating knob and the bell crank shown in FIGS. 4–7 differs from the embodiment of FIG. 1 in that the bell crank 11 is mounted at the inside of the cover 4 on a pivot pin 15a carried by the cover. Just as in FIG. 1 the modified crank 11 of FIGS. 4–7 has a projection 21 extending out through a bow-shaped aperture 20 in the cover 4. At 50 there is shown a screw which extends from the inside of the cover through a bow-shaped aperture 51 in the cover and is screwed into a threaded pin hole 52 in the operating knob 10 which also in this embodiment is markedly box-shaped but has a central reinforcement in the cavity opposite the shoulder 36. The aperture 51 in the cover 4 and the screw 50 form a means limiting the movement of the knob 10. The knob 10 may have a short pivot pin 25 (FIG. 7) which may be introduced through a circular hole 24 in the cover or may be adapted for mounting on an unthreaded part of a screw 25a, indicated by dashed lines in FIG. 4, which can be screwed into a threaded hole (such as the hole 26 in FIG. 1) in the part 2 of the housing. The spring 45 acts here between the crank 11 and an edge 35' of the cover and is mounted on the pivot pin 15a.

In the unactuated position of the knob, i.e. its normal rest position, the upper side 32 of the knob 10 is held against the shoulder surface 33 of the cover 4 by means of the spring 45 which lifts the knob and acts between the crank 11 and a stationary part of the housing or knob. In this position the upper arm 12 of the crank 11 can, or preferably should, have a small clearance relative to the push rod 7.

The following important advantages are realized by this invention:

(1) the operating knob 10 is placed on a low level at one side of the reel housing 1 (at the left-hand side for the right-handed or at the right-hand side for the left-handed);

(2) the direction of movement of the knob 10, when operated, is generally perpendicular to the longitudinal axis of the fishing rod;

(3) when the knob 10 is operated and held in an activating position the point of contact 41 between the knob 10 and the bell crank 11 and the point of contact 40 between the bell crank 11 and the push rod 7 are to lie in the direction of the resultants;

(4) a suitable gearing in the mechanism is provided by a suitable choice of lengths for the two arm parts of the bell crank 11;

(5) the knob is placed substantially outside the walls which together form a substantially tight housing;

(6) the only opening of importance in the closed gear housing is the aperture 20 in the cover 4 for the projection 21 of the bell crank 11 for cooperation with the operating knob 10 but this opening is covered by the knob;

(7) the contour of the rear face of the operating knob 10 is complementary to the corresponding surface of the reel housing;

(8) in the non-activated (unactuated) position of the operating knob 10 the upper side of the box-shaped portion of the knob is pressed against the underside of the shoulder of the cover by spring action upon the knob;

(9) the operating knob 10 is provided with a projection or bulge 35, whereby a mounting screw 17' for the cover, located near the pivot axis 25' of the knob, is accessible when the operating knob is in rest position.

The preferred embodiments described above realize all the indicated advantages but the design may be modified in various ways within the scope of the invention according to the appended claims, and modified designed need not achieve all these advantages. Thus, for example, a quite sufficient advantage resides in the fact that the operating knob has its pivot axis placed on a low level in front of a low operating surface which is easily accessible to the thumb of the "fishing rod hand". The operation of the push rod by means of the knob should preferably take place at a suitable ratio via a bell crank to exert the required force with the least possible strain on the thumb.

What we claim and desire to secure by Letters Patent is:

1. A fishing reel having forward and rear portions with a line spool at the forward portion and a foot at the bottom of the fishing reel connecting the fishing reel to a fishing rod, and comprising a gear casing at the rear portion of the fishing reel connected to the line spool;

transmission elements in said gear casing;

a thumb-operable knob having an operating surface and a hollow portion and pivotally mounted on said gear casing on a pivot having its pivot axis located at a level between the longitudinal axis of the line spool and the location of the foot and said pivot axis located near the bottom of said knob;

said transmission elements including a push rod slidably guided in the fishing reel between a position toward the forward portion of the reel and a position toward the rear portion of the reel, bell crank means pivotally mounted in said casing and having two arms with one of said arms positioned to actuate said push rod into a forward position by application of pressure on said push rod in the longitudinal direction thereof, a projection on the other of said arms extending into said hollow portion of said knob and positioned below said operating surface of said knob for operation thereon by said knob to pivot said bell crank means against said push rod by pivoting of said knob about is pivot axis by application of thumb pressure to its said operating surface in a same direction as the direction of movement of a point of contact between said knob and said bell crank means, and in the forward position of said push rod, a straight line between said pivot axis of said thumb-operable knob and the pivot axis of said bell crank mens forming an angle of approximately 90° in relation to a straight line between the pivot axis of said bell crank means and a point of application of pressure by said one of said arms of said bell crank means on said push rod.

2. A fishing reel as claimed in claim 1, further characterized by said pivot axis of said knob positioned forward of said operating surface of said knob with said knob mounted for pivotal motion substantially downward under thumb pressure to move said push rod into position for engagement with the line spool.

3. A fishing reel as claimed in claim 1, further characterized by said gear casing on one side thereof having a detachable cover having an aperture through which said projection on said arm extends, said knob detachably mounted on the outside of said detachable cover.

4. A fishing reel as claimed in claim 3, further characterized by said cover having a recessed portion, and said knob mounted at the outside of said recessed portion and having a base portion positioned in said recessed portion.

5. A fishing reel as claimed in claim 1, further characterized by said knob having a projection from its lower portion and having its said pivot axis passing through said projection.

* * * * *